United States Patent [19]

Koopman et al.

[11] Patent Number: 5,673,371
[45] Date of Patent: Sep. 30, 1997

[54] METHOD OF MODIFYING THE FATNESS OF CHARACTERS TO BE OUTPUT ON A RASTER OUTPUT DEVICE

[75] Inventors: Stephan B. J. Koopman, CL Reuver; Abraham Nico Abbekerk, BM Venlo, both of Netherlands

[73] Assignee: Oce-Nederland B.V., Venlo, Netherlands

[21] Appl. No.: 616,779

[22] Filed: Mar. 19, 1996

Related U.S. Application Data

[63] Continuation of Ser. No. 172,189, Dec. 23, 1993, abandoned.

[30] Foreign Application Priority Data

Dec. 28, 1992 [EP] European Pat. Off. ............ 92204086

[51] Int. Cl.[6] .................................. G06F 15/70
[52] U.S. Cl. ........................ 395/110; 395/150
[58] Field of Search ................ 395/100, 101, 395/102, 109, 110, 118, 128, 129, 142, 150, 151; 358/449, 451, 459; 382/242; 345/143

[56] References Cited

U.S. PATENT DOCUMENTS

| | | | |
|---|---|---|---|
| 4,620,287 | 10/1986 | Yam | 364/518 |
| 4,625,222 | 11/1986 | Bassetti et al. | 346/160 |
| 5,042,075 | 8/1991 | Sato | 382/47 |
| 5,099,435 | 3/1992 | Colling et al. | 395/150 |
| 5,253,336 | 10/1993 | Yamada | 395/142 |
| 5,280,576 | 1/1994 | Cao | 395/150 |
| 5,355,448 | 10/1994 | Uchino | 395/150 |
| 5,355,449 | 10/1994 | Lung et al. | 395/150 |
| 5,363,479 | 11/1994 | Olynyk | 395/142 |
| 5,367,617 | 11/1994 | Goossen et al. | 395/142 |

FOREIGN PATENT DOCUMENTS

| | | | |
|---|---|---|---|
| 0385269 | 9/1990 | European Pat. Off. | |
| 0393680 | 10/1990 | European Pat. Off. | 395/142 |
| 0447126 | 9/1991 | European Pat. Off. | |
| 3811396 | 10/1988 | Germany. | |
| 4093994 | 2/1992 | Japan. | |
| 4093992 | 7/1992 | Japan. | |
| 4120594 | 8/1992 | Japan. | |
| 4218094 | 12/1992 | Japan. | |

OTHER PUBLICATIONS

Barry et al., De Casteljau-type Subdivision is Peculiar to Bezier Curves, 1988, Butterworth & Co. (Publishers) Ltd., pp. 114–116.

Jin J. Chai, Data Reduction Using Cubic Rational B-splines. May 1992 IEEE Computer Graphics vol. 12 Issue 3.

*Primary Examiner*—Leo Boudreau
*Assistant Examiner*—Gabriel I. Garcia

[57] ABSTRACT

Font data which defines the shape of each character as an outline consisting of straight and curved line segments is transformed into bitmap representations of the individual characters such that the fatness of the character in the bitmap differs from that of the original font character by a predetermined fattening distance (f) by determining a modified outline on the basis of the font data and the fattening distance (f), and then compiling the bitmap representation by filling the modified outline with discrete pixels.

16 Claims, 8 Drawing Sheets

METHOD OF MODIFYING THE FATNESS OF CHARACTERS TO BE OUTPUT ON A RASTER OUTPUT DEVICE

This application is a continuation, of application Ser. No. 08/172,189 filed on Dec. 23, 1993, now abandoned.

BACKGROUND OF THE INVENTION

1. Field of the Invention

The present invention relates to the printing of text information, and more specifically, to modifying the fatness of characters to be output on a raster output device.

1. Discussion of Related Art

When text information is to be printed or displayed on a raster output device, for example a laser printer or a CRT tube, a bitmap representation of each character of the text is needed, which indicates for each pixel whether it belongs to the filled portion of the character or to the background. When a plurality of fonts is to be used, a large number of different bitmap representations may be needed for each character, because the bitmap representation is dependent on the font, the font size and on the pixel size with which the printer operates. In order to reduce the required amount of storage capacity and to improve the portability of the fonts among different output devices, it is convenient to define the shapes of the character of a font by giving mathematical descriptions of the outlines of the characters. The outline consists of one or more non-intersecting closed paths which represent the borders of the filled parts of the characters. Each path is an oriented curve which is passed through in a specific direction and, by convention, the filled (black) part of the character is found on the left side of the curve when passed-through in this direction. The mathematical description of each path may consist of coordinates of the end points of straight line segments and of support points of Bezier curves, as is disclosed in DE-A-38 11 396 and EP-A-0 393 680.

The bitmap representation can be derived from the outline by overlaying the pixel raster onto the outline and filling the area enclosed in the outline with black pixels. In this context, "black" means the color in which the characters are to be printed. Since the outlines can easily be scaled, only a single outline description is needed for each font character, and different font sizes can be obtained by scaling the outline. Thus, only little storage capacity is needed for storing the fonts in the printer. When a given piece of text is to be printed, bitmap representations need to be generated only for those fonts and font sizes which actually appear in the text. On the other hand, it is of course possible to generate and store bitmap representations of those fonts which are used most frequently. Since the outline representation is independent of the properties of the printer, the printable characters of a given font have a similar appearance, irrespective of the output device used for printing. Nevertheless, the properties of the printer may often have some effect on the appearance of the text, so that it is necessary or at least desirable to compensate these effects.

For example, laser printers may be divided into two major groups which are called "black writer" and "white writer", respectively. In a black writer, only those portions of the printed image are developed with black toner which have been exposed by the laser beam. In white writers, only those portions are developed which have not been exposed by the laser beam. In any case, the exposure spot created by the laser beam does not have an ideal square shape of the size of one pixel, but rather it has an approximately circular shape. As a consequence, the size of the exposure spot must be slightly larger than one pixel in order to provide a certain overlap for producing continuous white areas in a white writer and continuous black areas in a black writer, respectively. Due to this over-size of the exposure spot, black characters printed with a white writer appear more faint than black characters printed on a black writer. To compensate for this effect, the characters, more specifically the bitmap representations thereof, should be made fatter in a white writer. To this end, the bitmap representations may be hand-optimized by adding more black pixels at specific locations. However, this procedure would have to be carried out individually for each font, font size and type of printer engine and would therefore be very time consuming and costly and would cancel most of the advantages achieved by using outline descriptions. Accordingly, there is a need for efficient fattening methods which can be performed automatically.

Figure 13:
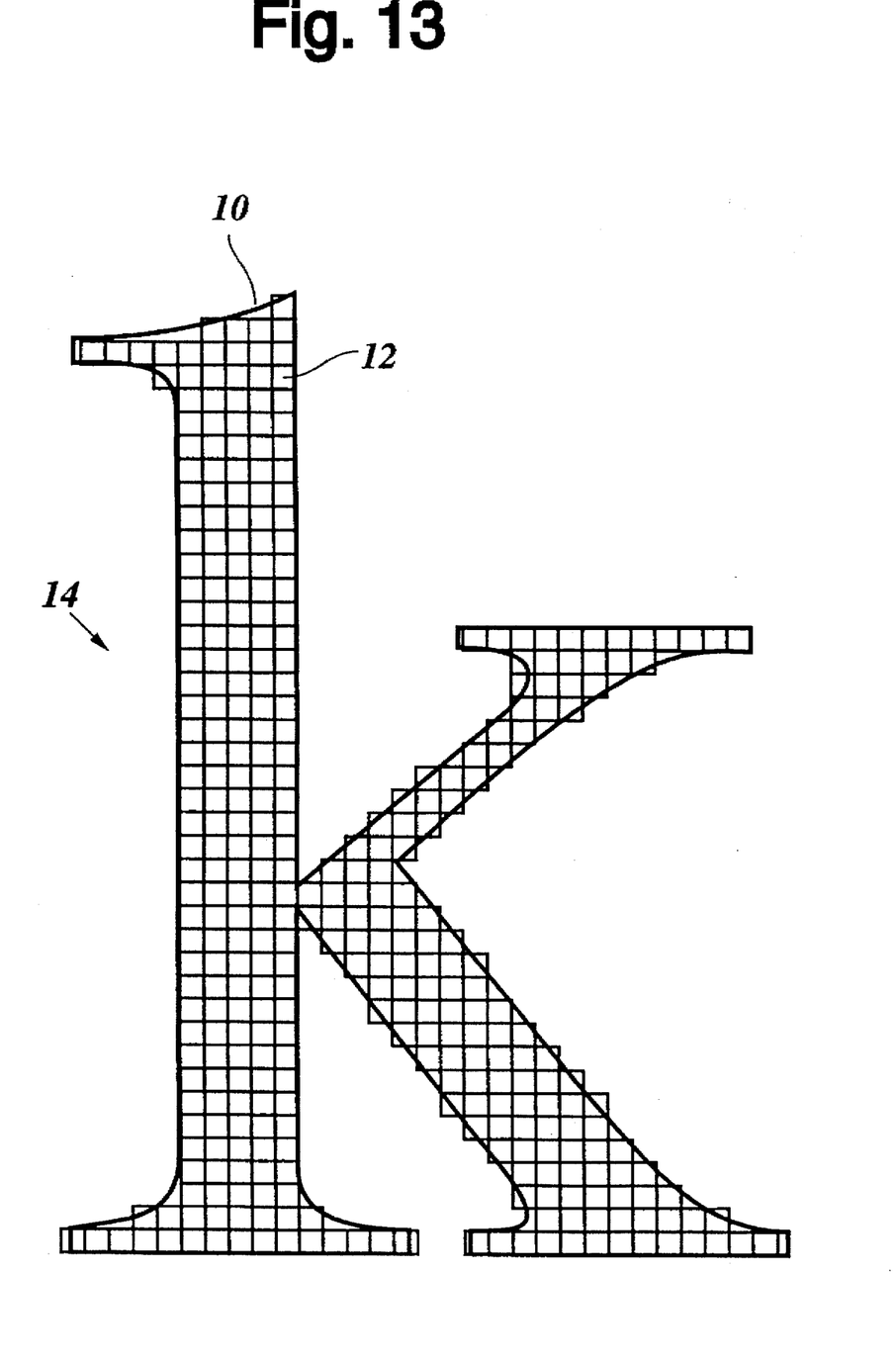
FIG. 13 illustrates an outline and a bitmap representation of a character "k"
Figure 14:
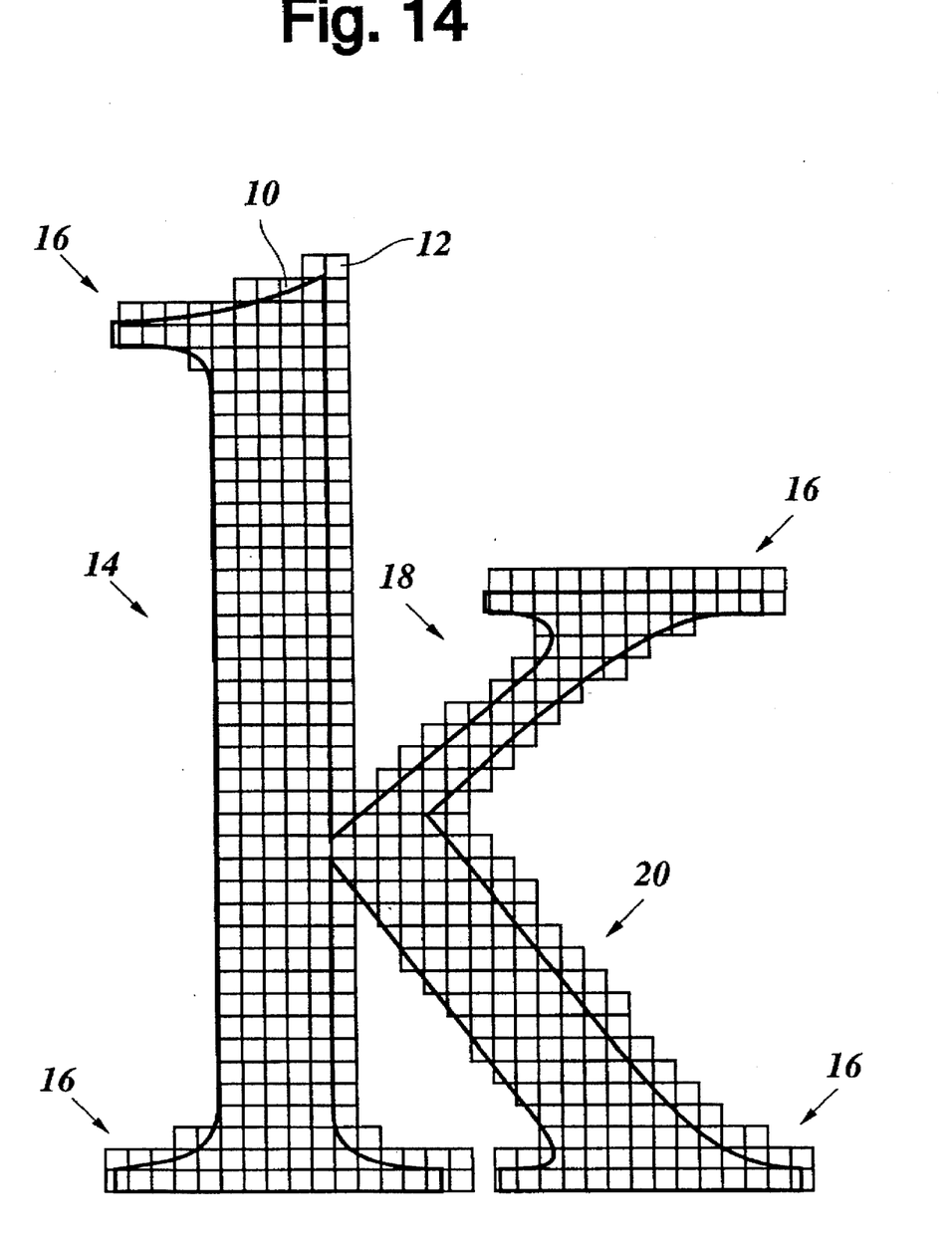
FIG. 14 illustrates a bitmap representation of the character shown in FIG. 13, fattened according to a method outside the scope of the present invention.

One approach of automatic fattening will be described below in conjunction with FIGS. 13 and 14. FIG. 13 shows the outline 10 of a character "k", as well as its bitmap representation overlaid on the outline. The black pixels of the bitmap are represented by gray squares 12. In order to fatten this character, the bitmap is first shifted by one pixel towards the right and the shifted bitmap is combined with the original one by logic OR. Then, the resulting bitmap is shifted by one pixel towards the top and this shifted bitmap is combined with the bitmap resulting from the first shift operation by logic OR. The result is shown in FIG. 14. It is noted that the vertical stem 14 of the character has been fattened by adding one pixel on the right edge. This is equivalent to the result which would have been obtained by shifting both the left and right borders of the stem 14 outward by ½ pixel. Since the fattening distance (f) is defined as the distance by which the borders of the filled part of the character are shifted outward, the fattening operation illustrated in FIGS. 13 and 14 corresponds to a fattening distance of ½ pixel. Similarly, the substantially horizontal borderlines at the top edges of the serifs 16 have been shifted upward by one pixel, which is equivalent to shifting the upper borders upward by one half pixel and shifting the lower borders downward by one half pixel. Thus, horizontal portions or stems of the character are also fattened, with f=½ pixel. However, it will be noted that in FIG. 14 the upwards inclined stem 18 and the downwards inclined stem 20 of the character have been fattened too much. Thus, the fattening achieved by this process is not uniform, and the appearance of the character is degraded.

Another drawback to this approach is that no smaller fattening distances than f=½ pixel can be obtained. In many cases, this fattening distance is too large for compensating the over-size of the exposure spot in white writers. It should be noted that fattening distances of less than ½ pixel are significant even though the spacial resolution of the printer is limited to one pixel. Due to this limited resolution, the width of vertical and horizontal lines or stems in the printed image can only be varied in steps of one pixel. However, the effective width of inclined lines or stems can be varied in steps which are considerably smaller than one pixel, and the appearance and readability of the printed text could be remarkably improved if it were possible to fatten such inclined portions of characters with an appropriate fattening distance.

U.S. Pat. No. 4,625,222 discloses another approach for automatic fattening of character bitmaps in a printing machine. According to this approach, gray pixels are added to the bitmap at specific locations at the border between black and white areas, so that the characters appear somewhat unsharp. The visual effect achieved by this measure is similar to a fattening with a fattening distance of less than ½ pixel. However, this approach is limited to printers which are capable of reproducing gray levels, and the improvements achieved in readability of the printed text are limited, because the human visual perception depends particularly on sharp contrasts between black and white areas, and the addition of gray pixels to the character means a loss of contrast.

U.S. Pat. No. 4,620,287 relates to the field of computer generated graphic arts and is concerned with the problem of changing the line weight of curved lines. This problem has some analogy with the problem of fattening characters. According to the approach disclosed in this patent, a curved line is approximated by a sequence of straight line segments and, in order to obtain larger line weights, these line segments are replaced by elongated rectangles with a width corresponding to the desired line width. With this method it is possible to achieve a uniform fattening with arbitrarily small fattening distances, but in order to preserve a smooth appearance of curved lines, the curve must be divided into a large number of segments and rectangles, respectively, so that the calculations and graphic operations to be performed by the computer become very time consuming.

SUMMARY OF THE INVENTION

Therefore, it is an object of the present invention to provide a method of modifying the fatness of characters to be output on a raster output device which will overcome the above noted disadvantages.

It is a further object of the present invention to provide a method by which the fatness of characters can be finely and efficiently adjusted by an arbitrary amount.

Another object of the present invention is to provide a printer whereby the fatness of characters to be output by a raster output device can be adjusted by an arbitrary amount.

The foregoing objects and others are accomplished in accordance with the present invention, generally speaking, by providing a method whereby font data which mathematically defines the shape of each individual font character as an outline consisting of straight and curved line segments is transformed into bitmap representations of the individual font characters, such that fatness of the respective characters in the bitmap representation differs from the original font character by a predetermined fattening distance (f). A modified outline of each original character is calculated on the basis of the original character font data and the predetermined fattening distance (f) and the bitmap representation determined by filling the modified outline with discrete pixels. Whereas, the previously discussed methods of fattening characters are performed at the bitmap level, it is an important feature of the present invention that the fattening is performed with the character outline before this outline is transformed into the bitmap representation. The modified outline is obtained by an outward shifting of the original outline by the fattening distance (f). A circle having a radius equal to the fattening distance (f) is drawn around each point of the original outline. The modified outline is the outer envelope of all these circles. It is also possible to admit negative fattening distances corresponding to a reduced fatness of the characters. If (f) is negative, then the modified outline is defined by the inner envelope of the circles.

In a preferred embodiment of the method according to the present invention, the mathematical description of the modified outline has the same format as the description of the original outline. For example, if the original outline is defined by end points of straight line segments and control points of Bezier curves, then the modified outline is also defined by the coordinates of the end points of straight line segments and control points of Bezier curves which approximate the ideal shape of the modified outline. This embodiment has the advantage that the fattening distance can be selected as desired, and a uniform fattening of the characters is achieved. Further, this method is compatible with the conventional technique of character generation, because the modified outline is described in the same format as the original outline and consequently the usual methods and systems for filling the bitmap may remain unchanged.

The applicability of the invention is not limited to the correction of specific features of the raster output devices. It has been found that the legibility of a printed text is greatly influenced by the setting of the fatness of the characters, in particular in case of small font sizes, but that there are great differences in the fatness which is regarded as optimum by different individuals. The invention now offers the possibility to individually adjust the fatness in accordance with the preferences of the user. Accordingly, a text reproduction system, e.g. a printer, according to the invention, may be equipped with a selector switch for adjusting the fatness of the characters to be printed. As an alternative, the fatness may also be set in a host computer from which the text is transmitted to the printer. In this case, if the printer is shared by a plurality of users in a network, each user may set the fatness individually. Optimization of the fatness of the characters is important not only from the viewpoint of legibility but may also be useful for improving optical character recognition (OCR).

The invention further offers the possibility of non-linear scaling, which means that the fatness is increased disproportionately for small font sizes, in order to improve the legibility. This has been common practice in the art of printing with metal types, but has heretofore been difficult to implement in digital printing machines.

Another useful application is the correction of discretization errors. Such errors result from the fact that, in the bitmap consisting of discrete pixels, the line width of diagonal lines or stems can be reproduced with much higher accuracy than the line width of vertical and horizontal lines or stems. For example, if the vertical and diagonal stems of, for example, the character "N" are required to have a width of 3.8 pixels according to the selected font and font size, the width of the vertical stems will be rounded to 4 pixels in the discretization process. However, the average width of the diagonal stem will still be approximately 3.8 pixels, even after discretization. Thus, the discretization produces an undesirable imbalance in stem widths. According to the instant invention, this imbalance can be avoided by selecting a fattening distance of f=0.1 pixel. Then, the width of both the vertical and diagonal stems will uniformly amount to 4.0 pixel before and after discretization.

BRIEF DESCRIPTION OF THE DRAWINGS

The invention will now be described in detail in conjunction with the accompanying drawings in which.

DETAILED DISCUSSION OF THE INVENTION

Figure 1:
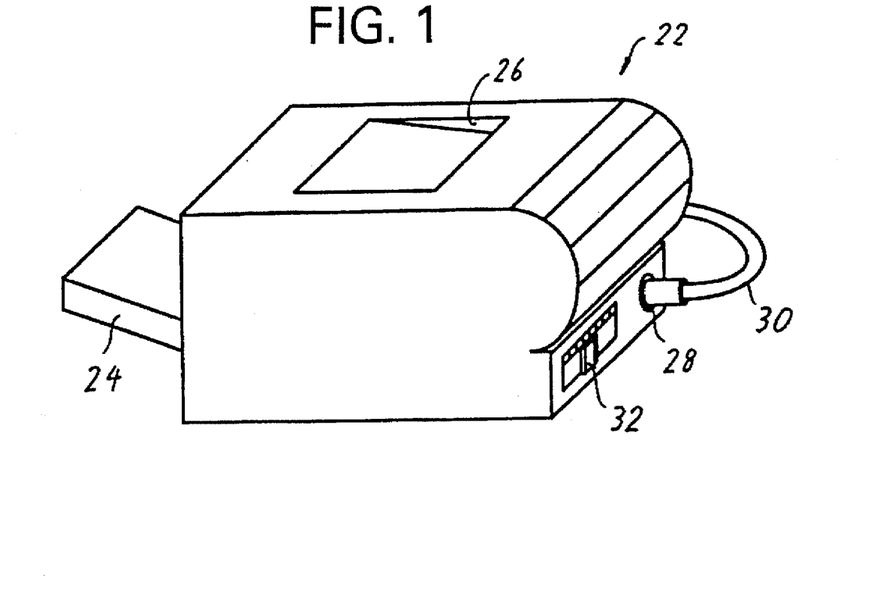
FIG. 1 is a perspective view of a laser printer embodying the invention.

In FIG. 1, a laser printer 22 is shown which comprises a paper supply tablet 24 and a discharge bin 26 for printed copies. On the rear side of the housing of the laser printer 22, there is provided a connector 28 for a cable 30 via which the data to be printed is received from a host computer (not shown). In addition, there is provided a selector switch, for example a slide switch 32, which permits adjustment to the fatness of the characters of printed text.

Figure 2:
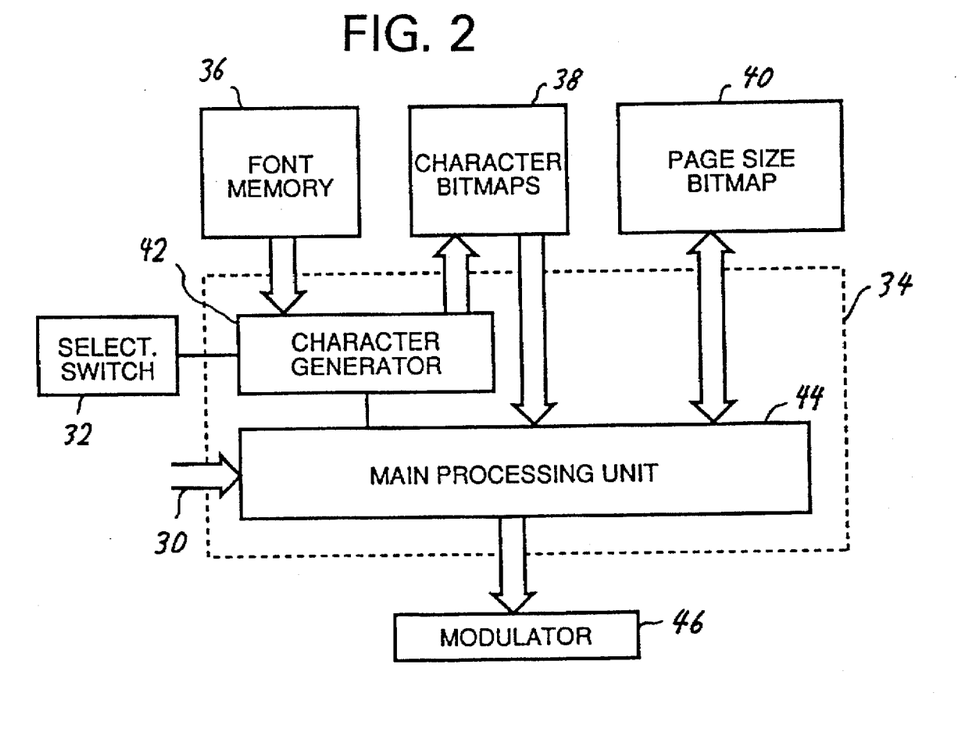
FIG. 2 is a block diagram of the laser printer.

FIG. 2 is a block diagram of the electronic control system of the laser printer 22. This control system generally comprises a data processing block 34, a font memory 36, a character bitmap memory 38 and a page size bitmap memory 40. The data processing block 34 includes a character generator 42 which may be part of a main processing unit 44 but is shown separately in the drawing for the sake of clarity.

Font memory 36 stores a plurality of fonts in a predetermined format in which the shape of each character is specified by a mathematical description of its outline. The character generator 42 reads the font data from the font memory 36 and expands the outline description of each character of a selected font into a character bitmap which is then stored in the character bitmap memory 38.

The main processing unit 44 receives the text data which are transmitted via the cable 30 and, in accordance with these data, it fetches the bitmap representations of the individual characters from the character bitmap memory 38 and stores them at the desired position in a page size bitmap memory 40. When a complete page has been mounted in this way, the main processing unit reads the contents of the page size bitmap from memory 40 and sends them as a pixel bit stream to a modulator 46 for modulating the laser beam of a raster output scanner provided in the laser printer 22. When the main processing unit receives data for a new printing job, it checks whether the fonts required in this printing job are available already in the character bitmap memory 38. If the required fonts are not yet available at bitmap level, the main processing unit commands the character generator 42 to expand these fonts into bitmaps before the filing of the page size bitmap begins.

The selector switch 32 is connected to the character generator 42 and supplies a signal indicating a fattening distance (f) by which the fatness of the characters is modified. If f is positive, the bitmap representations are generated in such a manner that each character is fattened by the amount f as compared to the outline stored in the font memory 36. If f is negative, the bitmap representation of the character becomes leaner than the outline in the font memory.

Figure 3:
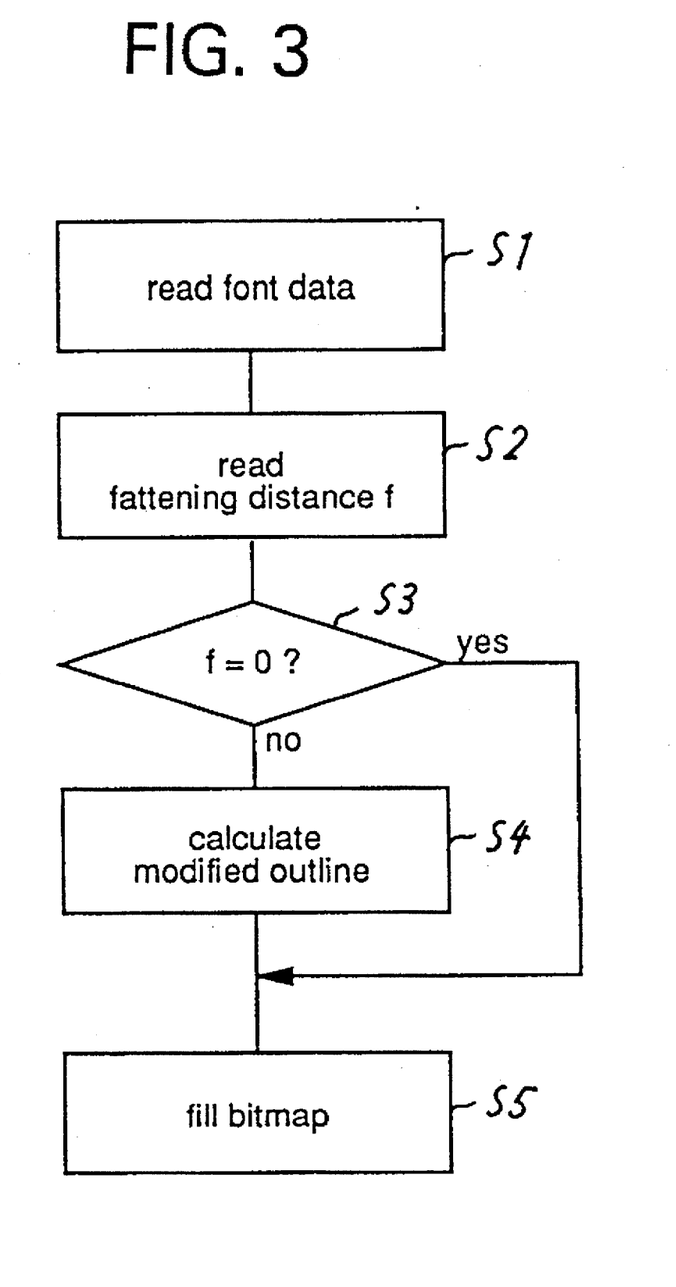
FIG. 3 is a flow chart illustrating the general steps of a fattening method according to the invention.

The process performed by the character generator 42 is illustrated in FIG. 3. In step S1, the mathematic description of the outline of each character is read from the font memory 36. In step S2, the character generator 42 reads the fattening distance (f) which has been set by means of selector switch 32. If it is found in step S3 that the fattening distance (f) is not equal to zero, then a mathematical description of a modified outline is calculated in step S4. The modified outline is generally obtained by shifting each point of the original outline outward by the distance (f). The necessary calculations depend on the format in which the mathematical description is stored in the font memory. A specific example will be explained below.

When the modified outline has been established in step S4, the character generator 42 proceeds with step S5 in which the character bitmap is filled. In this step, the printing color (black) is assigned to each pixel in the character bitmap which is located within the contour specified by the modified outline, and the background color (white) is assigned to all remaining pixels of the character bitmap. If it is found in step S3 that f equals zero, no modified outline needs to be calculated, and the step S4 is skipped.

Figure 4:
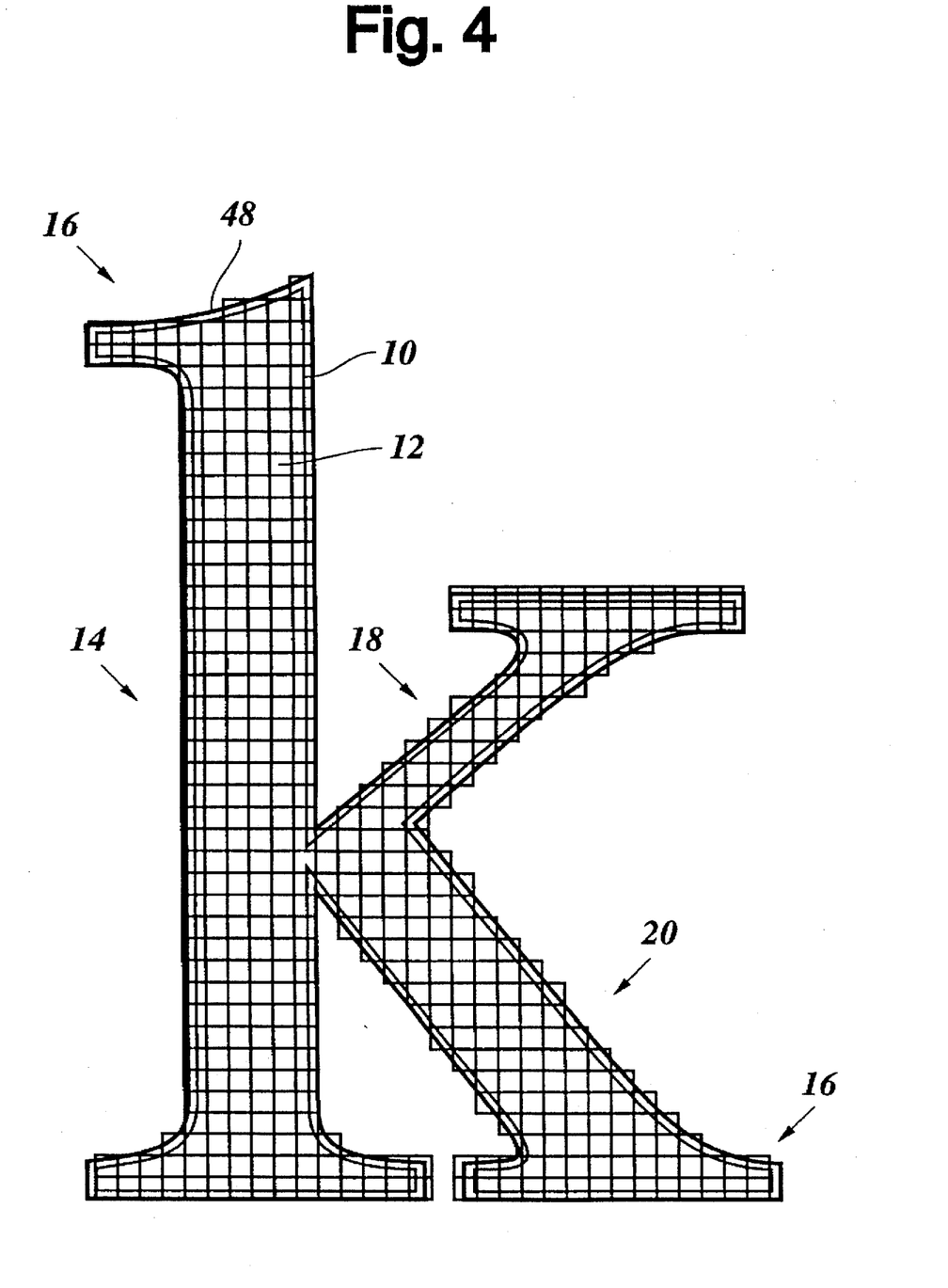
FIG. 4 shows an outline and a bitmap representation of the character "k" fattened in accordance with the invention.

FIG. 4 shows the result of this fattening operation when applied to the character "k" shown in FIG. 13. The original outline 10 has been shifted outward by the fattening distance (f)=0.4 pixel to obtain the modified outline 48. On the basis of an appropriately modified hint, the outline 48 has been positioned in relation to the grid of the bitmap in such a manner that the right border line of the vertical stem 14 is exactly aligned with a column of the grid. Then, in step S5, the modified outline 48 has been filled with black pixels 12, that is to say, each pixel of which the center falls within the outline 48 has been made black.

When comparing the bitmap representations shown in FIGS. 4 and 14, it will be observed that in FIG. 4 a smooth and uniform fattening of the character "k" has been obtained and that the widths of the respective stems 14, 18, and 20 are substantially in the same proportion as in FIG. 13. In case of the vertical stem 14, the difference between the fattening distance of 0.4 pixels used in FIG. 4 and the fattening distance of 0.5 pixels used in FIG. 14 cannot be observed because in the discretization step S5 the stem width is rounded to 6 pixels. However, looking at the borders of the diagonal stems 18 and 20 in FIG. 4, it will be observed that a number of new pixels would have to be added if the fattening distance were increased from 0.4 pixels to 0.5 pixels. Thus, even small variations of the fattening distance (f) in the order of 0.1 pixels have a noticeable effect. If a fattening distance, f=0.2 pixels, had been chosen in FIG. 4, the width of the vertical stem 14 would have been 5 pixels, as in FIG. 13, but a slight fattening effect would nevertheless have been observable at the diagonal stems 18 and 20.

A process of calculating the modified outline 48 in step S4 will now be explained in detail in conjunction with FIGS. 5 to 12.

Figures 5A, 5B, 6:
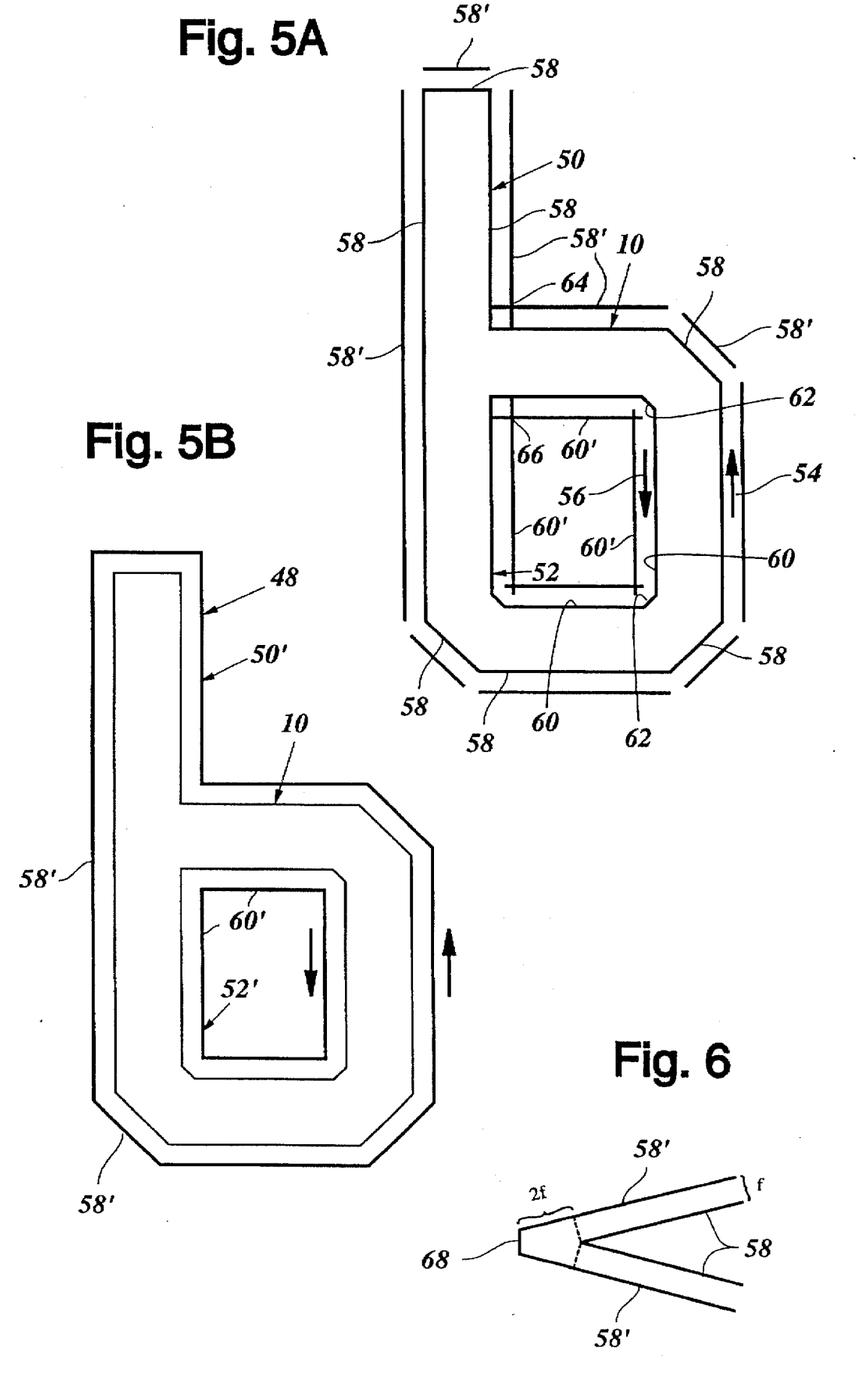
FIGS. 5A & 5B illustrate the process of fattening a character which is bounded by straight line segments.
FIG. 6 illustrates a special case where straight line segments of an outline meet at an acute angle.

FIG. 5A shows the outline 10 of a character "b". This outline consists of two closed paths 50 and 52 by which the dark area of the character is bounded and an orientation indicated by arrows 54 and 56, respectively. By convention, the dark area of the character is found on the left side of the path 50 or 52, if viewed in the direction of the associated arrow 54 or 56, respectively. In the shown example, the path 50 consists only of straight line segments 58, and the path 52 consists only of straight line segments 60 and 62. The modified outline 48 which is shown in FIG. 5B is obtained from the original outline 10 by executing the following steps.

In a first step, the straight line segments 58, 60 and 62 are shifted by the fattening distance (f) in a direction normal to the direction of the line segment. If f is positive as in the shown example, the line segments are shifted outward, i.e. to the right side in relation to the arrow 54 or 56, respectively. In this way, new line segments 58' and 60' are obtained. Although some of the original line segments 60 are separated by the small line segments 62, it will be observed that the new line segments 60' intersect each other, so that the small line segments 62 become redundant. This is why no shifted line segments corresponding to the line segments 62 have been shown. Such redundant line segments may generally occur when the original line segments are very small, i.e. in the order of the fattening distance (f).

In a second step, the new line segments 58' are linked in order to form a new closed path 50', and the new line segments 60' are linked to form a new closed part 52', as is shown in FIG. 5B. In the process of linking the new line segments, two cases may be distinguished. It will be noticed that in FIG. 5A two of the new line segments 58' intersect at an intersection point 64 whereas the other pairs of adjacent line segments 58' do not intersect but form gaps therebetween. In case of the path 52, all of the new line segments 60' intersect at intersection points 66.

A first substep of the linking procedure therefore consists of checking whether the new line segments intersect. This test should be performed not only for all pairs of adjacent line segments 58', but more generally for all pairs of new line segments 58' and 60' for which the distance of two end points is smaller than a certain value (in the order of the fattening distance (f). If it is found that the line segments intersect, the intersection point 64 or 66, respectively, is taken as the new common end point of the two line segments, i.e. the end portions which project beyond the intersection points are cut away from the line segments, and any redundant line segments are removed.

If the shifted images 58' of two adjacent line segments 58 do not intersect, then there are two possibilities for linking the new line segments 58'. One possibility is adding a new (straight or curved) line segment interconnecting the end points of the line segments 58'. Another possibility is extending the line segments 58' until they intersect. This solution has been adopted in FIG. 5B. If this latter approach is used, some special provisions should be made for the case that two line segments 58 meet at a very acute angle, as is shown in FIG. 6. Then, the distance by which the two new line segments 58' had to be extended until they intersect, may become undesirably large. It is therefore preferable to limit the distance by which the line segments 58' are extended to two times the fattening distance (f). If the new line segments 58' still do not intersect after they have been extended by 2f, then the new end points of the extended line segments 58' are interconnected by an additional line segment 68, as is shown in FIG. 6. If the extension is limited to 2f, an additional line segment 68 becomes necessary whenever the angle formed between the two line segments 58 is smaller than 60°.

In most commercially available fonts, the outline description includes not only straight line segments but also curved line segments. As a consequence, there should also be provided an appropriate method for handling curved line segments in the fattening process.

A mathematical description of a curved line segment may be given in various ways. However, a description which is suitable for outline fonts should at least provide the following parameters:

(1) Coordinates of the starting point P0 of the line segment, (2) Coordinates of the end point P3 of the line segment, (3) Tangent direction at P0, and (4) Tangent direction at P3.

Further, there should be provided at least one additional parameter which defines the shape of the curve in its intermediate portion.

A closed path forming part of a character outline will generally consist of a plurality of straight and curved line segments, and frequently this path will be capable of differentiation even in the starting points and end points of the individual line segments. This means that the tangent direction at the starting point is identical with the tangent direction at the end point of the preceding curved line segment or with the direction of the preceding straight line segment, respectively. In order to make sure that his holds true also for the modified outline, the method used for transforming a curved line segment of the original outline into a corresponding line segment of the modified outline should fulfill the following conditions: (1) The starting points and the end points of consecutive line segments should be shifted in the same direction and by the same distance, preferably by the distance (f) and in the direction normal to the tangent line, and (2) The transformation should preserve the tangent directions at the starting point and at the end point.

Then, the above-mentioned additional parameter or parameters should be varied to approximate the ideal shape of the modified outline with a sufficient accuracy. As an example, we will now describe a method of transforming a curved line segment which is given by a third order Bezier curve.

Figure 7:
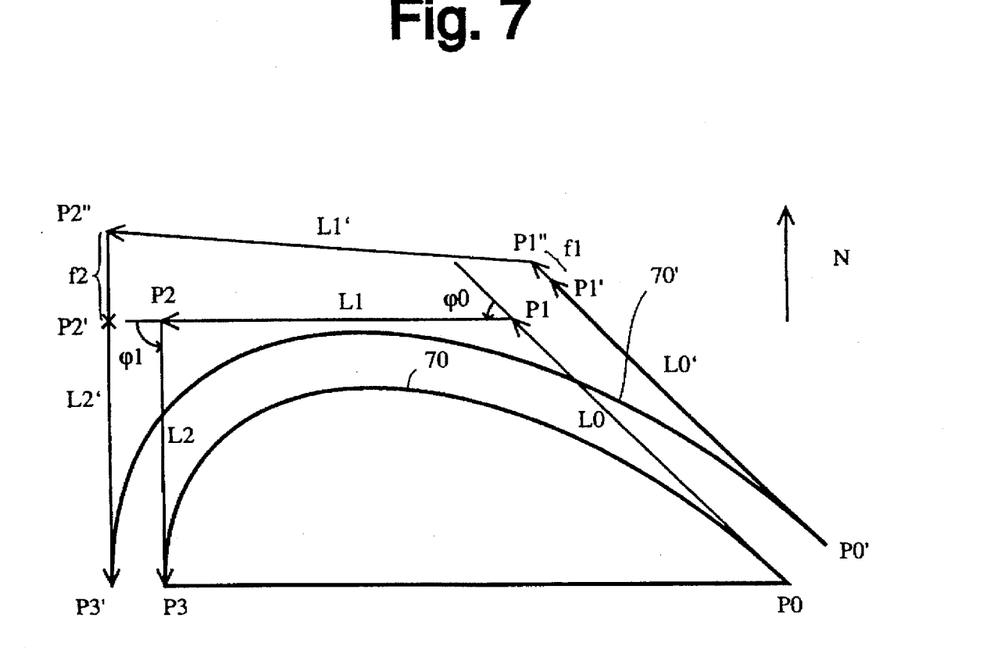
FIGS. 7 and 8 illustrate a method of fattening outline segments which are defined as Bezier curves.

Referring to FIG. 7, a third order Bezier curve 70 can be defined by the coordinates of four control points P0, P1, P2 and P3. The control points P0 and P3 are the starting point and the end point, respectively, of the line segment. The control point P1 defines the direction of the tangent line at P0, and the control point P2 defines the direction of the tangent line at P3. Given the starting point and the end point of the curve and the tangent directions at these points, the description still includes two degrees of freedom which are represented by the positions of the control points P1 and P2 on the straight lines passing through P0 and P1 and through P2 and P3, respectively.

The exact shape of the Bezier curve is given by the vector equation:

$$P(t)=P0(1-t)^3+3P1(1-t)^2t+3P2(1-t)t^2+P3t^3 \quad (1)$$

When (t) is continuously increased from 0 to 1, the point P(t) travels along the Bezier curve 70 from P0 to P3. The orientation of the Bezier curve is given by the direction of increasing t. Thus, the Bezier curve 70 shown in FIG. 7 bounds a convex portion of the filled part of the character. The orientation of the curve is also indicated by the direction of the vectors L0=P1–P0, L1=P2–P1 and L2=P3–P2, which interconnect the control points P0 through P3.

The Bezier curve 70 is transformed into a new Bezier curve 70' as follows. The control points P0 and P1 are shifted by the fattening distance (f) in a direction normal to the vector L0. If (f) is positive, the shifting direction is towards the right side of the vector L0. Thus, new points P0' and P1' and a new vector L0' are obtained. The control points P2 and P3 and the vector L2 are shifted in the same manner to obtain new control points P2' and P3' and a new vector L2'. The point P1' is then moved in the direction of the vector L0' by a certain distance f1, so that a new control point P1" is obtained. The distance f1 is a function of the vectors L0, L1, L2 and the fattening distance (f). The sign of f1 is equal to the sign of the scalar product between the vector L0 and a vector N which is normal to a line connecting P0 and P3 and points to the right if viewed from P0 towards P3. In FIG. 7, N points upwards, and since L0 also has an upward component, f1 is positive, that is, P1' is moved in the positive direction of L0'. Similarly, the point P2' is moved in the direction of the vector L2' by a distance f2. The distance f2 is also a function of L0, L1, L2 and f, and the sign of f2 is equal to the sign of the scalar product between L2 and N. In FIG. 7, L2 and N point in opposite directions, and accordingly the point P2" is obtained by moving the point P2' in the negative direction of the vector L2'.

The absolute value of f1 is obtained as a function of the angle $\phi 0$ between the vectors L0 and L1:

$$|f1|=(4/3) \cdot f \cdot (1- \cos (\phi 0));$$

$$\cos (\phi 0)=L0*L1/(|L0|\cdot|L1|)(* \text{ means scalar product}) \quad (2)$$

Similarly, the absolute value of f2 is obtained as a function of the angle $\phi 1$ between L1 and L2:

$$|f2|=(4/3) \cdot f \cdot (1- \cos (\phi 1));$$

$$\cos (\phi 1)=L1*L2/(|L1|\cdot|L2|) \quad (3)$$

Figure 8:
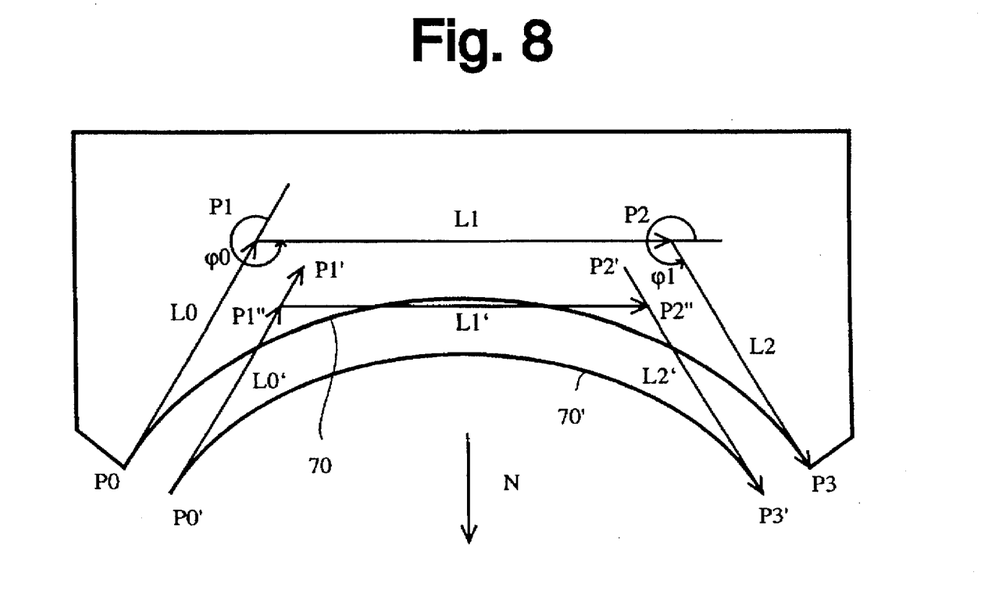

These formula have been used in the examples shown in FIGS. 7 and 8. In FIG. 8, the Bezier curve 70 bounds a concave portion of a character.

The above described method will provide satisfactory results for most practical cases. However, for certain Bezier curves, better results are obtained with the following formulae:

$$|f1|=(4/3) \cdot f \cdot (1- \cos (\phi 0/2));$$

$$\phi 0 = \text{arc cos } (L0*L1/(|L0|\cdot|L1|)) \quad (2')$$

$$|f2|=(4/3) \cdot f \cdot (1- \cos (\phi 1/2));$$

$$\phi 1 = \text{arc cos } (L1*L2/(|L1|\cdot|L2|)) \quad (3')$$

In the following TABLE, the formula giving the best results are indicated in dependance of the values of the angles $\phi 0$ and $\phi 1$.

In the TABLE, "I" means that the angle is in the first quadrant ($0° \leq \phi < 90°$), "II" means that the angle is in the second quadrant ($90° \leq \phi < 180°$), and so forth. In this connection, the angle $\phi 0$ between the vectors L0 and L1 is found by counter-clockwise turning L0 until it coincides with L1. The angle $\phi 1$ is found in an analogous manner. The angles $\phi 0$ and $\phi 1$ are indicated in FIGS. 7 and 8.

TABLE

| $\phi 0$ | $\phi 1$ | preferred formula |
|---|---|---|
| I | I | (2) and (3) |
| I | II | (2) and (3) |
| I | III | (2) and (3') |
| I | IV | (2) and (3) |
| II | I | (2) and (3) |
| II | II | (2) and (3) |
| II | III | (2') and (3') |
| II | IV | (2') and (3) |
| III | I | (2') and (3) |
| III | II | (2') and (3') |
| III | III | (2') and (3') |
| III | IV | (2) and (3) |
| IV | I | (2) and (3) |
| IV | II | (2) and (3') |
| IV | III | (2) and (3) |
| IV | IV | (2) and (3) |

These formula provide also satisfactory results in cases where the Bezier curve has an S-like shape. An alternative approach in these cases is to divide the S-shaped Bezier curve into two Bezier curves with uniform curvature. Then, each of these two Bezier curves can be transformed in the manner described in conjunction with FIGS. 7 and 8.

Figure 9:
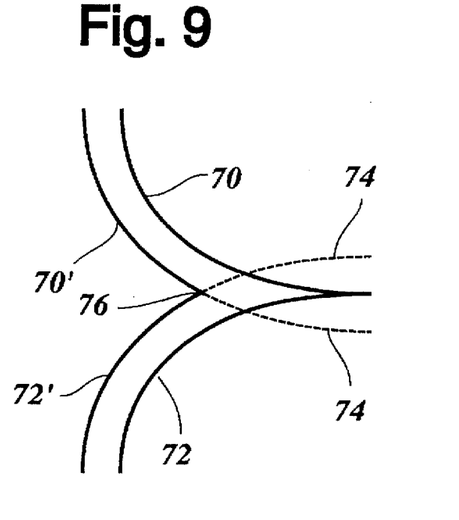
FIGS. 9 to 12 illustrate a method of approximately determining an intersection point between curved line segments.
Figure 10:
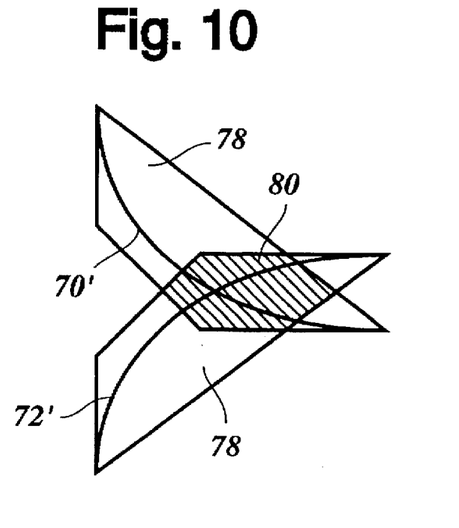
Figure 11:
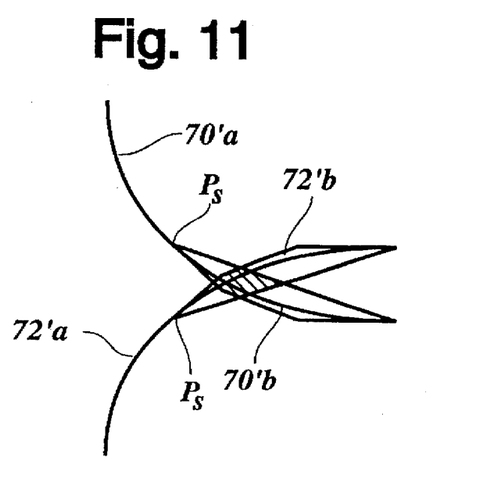
Figure 12:
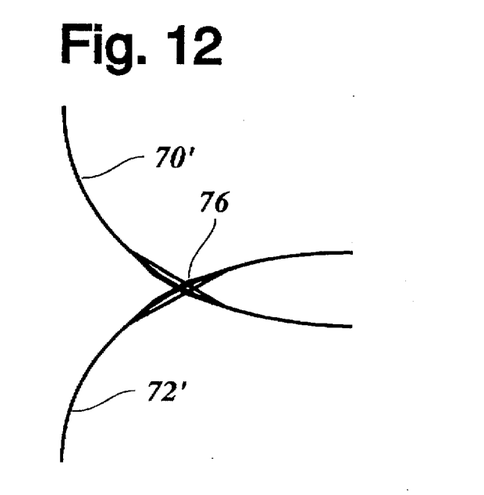

If the starting point and/or the end point of a Bezier curve is a non-differentiable point of the path, i.e. if the Bezier curve forms an angle with an adjacent Bezier curve or an adjacent straight line segment, then the segments of the modified outline must be linked with each other. Like in the case discussed in conjunction with FIGS. 5A and 5B, the new line segments may intersect each other or may form a gap therebetween. If a gap is formed, the Bezier curves may be extended by adding a straight line segment which has the same orientation as the tangent line at the corresponding starting point or end point of the Bezier curve. This procedure corresponds to what has been described in conjunction with FIGS. 5 and 6. If, however, the new Bezier curve intersects an adjacent Bezier curve or an adjacent straight line segment, the problem to be solved is to determine the intersection point. As an example, FIG. 9 illustrates two Bezier curves 70 and 72 which meet at an acute angle. Such a situation is encountered for example in the character "8". When the Bezier curves 70, 72 of the original outline have been transformed into new Bezier curves 70', 72', the redundant sections 74 on one side of the intersection point 76 must be removed. To this end, the intersection point 76 between the two Bezier curves 70' and 72' has to be determined. This intersection point 76 can approximately be determined by means of a recursion which is illustrated in FIGS. 10 to 12. In a first step illustrated in FIG. 10 it is checked whether the bounding boxes 78 of the two Bezier curves 70', 72' overlap. The bounding boxes are the quadrangles which are defined by the control points of the respective Bezier curves. In the shown example, the bounding boxes 78 overlap in the darkly shaded area 80. The test for determining whether or not there exists an overlap 80 between the two bounding boxes 78 is a straightforward algorithm which need not be explained in detail. When it is found that an overlap 80 exists, each Bezier curve 70,72 is bisected at a point $P_S=P(t=0.5)$. Thus, the Bezier curve 70' is divided into two smaller Bezier curves 70'a and 70'b, and the Bezier curve 72' is divided into new Bezier curves 72'a and 72'b.

The control points of the Bezier curves 70'a, 70'b can be derived from the control points of the curve 70' pursuant to the DeCasteljau method which is described by P. J. Barry and R. N. Goldman in "Computer Aided Design", Vol. 20, No. 3, April 1988, pages 114 to 116. In brief, if a Bezier curve is to be intersected at an intersection point $P(t_S)$, each of the straight line segments connecting the control points P0 and P1, P1 and P2 and P2 and P3, respectively, are divided in accordance with the division ratio $t_S/(1-t_S)$. Then, the two lines which connect the three division points obtained in this way are again divided pursuant to the same division ratio, and the resulting two division points are again divided pursuant to the same division ratio. It can be shown that the single division point obtained in this way lies on the Bezier curve and is equal to the point $P(t_S)$. The division points are the control points of the new segments.

Once the control points for the curves 70'a, etc. have been determined, it is checked whether there exists an overlap between the bounding boxes of the curves 70'a and 72'a or between the curves 70'b and 72'b. Dependent on the result of this test, either the curves 70'a and 72'a or the curves 70'b and 72'b are again bisected in the same manner as described above, so that still smaller sub-curves and bounding boxes are obtained, as is shown in FIG. 12. This procedure is iterated for several times, and as the size of the bounding boxes shrinks, a good approximation of the intersection point 76 is obtained already after a few iteration steps. Normally, no more than 8 steps of iteration are required.

After the intersection point 76 has been determined, it is used as the new starting/end point of the portions of the curves 70' and 72' that are to be retained. The other new control points P1, P2 of these portions are calculated using the DeCasteljau method. If an intersection point between a Bezier curve and a straight line segment needs to be determined, the procedure is analogous to what has been described above, with the only difference that an overlap between the straight line segment and the bounding box of the single Bezier curve is determined.

The above-described method of determining the intersection point provides not only the coordinates of the intersection point 76 but also the corresponding parameters of the Bezier curves 70' and 72', respectively. Thus, the DeCasteljau method can again be used for dividing the Bezier curves 70' and 72' at the intersection point 76 in order to obtain the control points for the remaining curves 70' and 72' without the redundant sections 74.

The invention has been described above in terms of specific embodiments. It will be understood, however, that the invention is not limited to these embodiments. For example, any known method for determining an intersection point of a Bezier curve with another Bezier curve or straight line may be used instead of the procedure described above. Further, the formulae (2), (3) and (2'), (3') for calculating the control points of the Bezier curves in the modified outline may be replaced by any other suitable algorithm for approximating the ideal shape of the modified outline.

At present, the approach described in this specification is deemed preferable because it provides satisfactory results without requiring too much calculation time, and, most important, because it can be proved that this procedure is mathematically stable.

In addition to the information on the shape of the characters, commercially available fonts usually include also pieces of information which are called "hints" and which serve for properly adjusting the position of the characters to the grid of the raster output device. Such hints may for example specify certain reference positions for aligning the characters with the lines and columns of the pixel grid. In these cases, it may also be necessary to modify the hint information in accordance with the selected fattening distance.

The invention is not limited to fonts in which curved line segments of the outline are described by third order Bezier curves or by Bezier curves at all. Whatever description for curved line segments may be used, the transformation for obtaining the modified outline is such that the same kind of description is usable also for the curved line segments in the modified outline.

In the laser printer shown in FIG. 1, the slide switch 32 for inputting the fattening distance (f) is accessible to the user. In a modified embodiment, input means for setting the fattening distance (f) may be provided within the housing of the laser printer so that they are accessible only to a maintenance engineer. Further, a command for setting the fattening distance (f) may be transmitted from the host computer together with the other printing data. In this case, the main processing unit 44 is adapted to decode the command received from the host computer and to supply a corresponding set value for the fattening distance (f) to the character generator 42. If the system is additionally provided with the selector switch 32, the signal received from this selector switch may be treated as a default setting for the fattening distance.

Finally, it should be noted that the method according to the invention can be implemented not only in a printer or more generally, in a raster output device, but can also be implemented in an apparatus which is specifically designed for generating character bitmaps which are then loaded directly into the character bitmap memory 38 of the printer, so that the printer need not be equipped with a font memory 36.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A computer-implemented method of modifying the fatness of characters to be output on a raster output device, which characters are individually defined by font data specifying an original outline including mathematically described line segments, of which at least one segment is a third order Bezier curve, for transformation into a bitmap representation by filling said original outline with discrete pixels, the computer-implemented method comprising:

a) determining a mathematically described modified outline on the basis of individual font data of said characters to be modified a predetermined fattening distance (f), and b) transforming said modified outline into a bitmap representation of each respective individual character having a modified fatness by filling said modified outline with discrete pixels; wherein the original outline includes at least one curved segment that is a third order Bezier curve defined in part by end control points P0 and P3; and the step a) including always moving the end points P0 and P3 of the at least one curved segment a predetermined distance f, independently of information regarding any segment adjoining the segment being modified, in directions normal to lines tangent to the original outline at points P0 and P3, respectively.

2. A printer for printing characters individually defined by font data specifying an outline thereof including mathematically described line segments, of which at least one segment is a third order Bezier curve, the printer comprising:

a font memory for storing font data which defines the shape of each original individual font character as an original outline including mathematically described segments;

a bitmap memory for storing bitmap representations of said individual characters;

a character generator for transforming said font data into said bitmap representations by filling an outline with discrete pixels;

a raster output device; and a controller for receiving encoded text data and for supplying bitmap data stored in said bitmap memory to said raster output device in accordance with said received text data; wherein said character generator comprises modifier means for modifying the fatness of font characters in said bitmap representation by determining a mathematically described modified outline on the basis of said original individual font data a predetermined fattening distance (f), and delivering said modified outline for transformation into a bitmap representation;

the printer further including a user operable switch for inputting said fattening distance (f);

wherein the original outline includes at least one curved segment that is a third order Bezier curve defined in part by end control points P0 and P3; and wherein the modifier means also is for moving the end points P0 and P3 of the at least one curved segment a predetermined distance f, independently of information regarding any segment adjoining the segment being modified, in a direction normal to a line tangent to the original outline at points P0 and P3, respectively.

3. A computer-implemented method of modifying the fatness of characters to be output on a raster output device, which characters are individually defined by outline font data specifying an original outline including mathematically described line segments for transformation into a bitmap representation by filling said outline with discrete pixels, said original outline including at least one curved line segment that is a third order Bezier curve defined by control points P0, P1, P2 and P3, the points P0 and P3 being starting point and end point, respectively, and the points P1 and P2 being middle control points situated on original tangent lines, at points P0 and P3, respectively, of said curved line segment, the computer-implemented method comprising:

determining a modified outline on the basis of the individual outline font data of said characters to be modified and a predetermined fattening distance f; and transforming said modified outline, instead of said original outline, into a bitmap representation; wherein for each curved line segment of the original outline, a modified curved line segment of said modified outline is a third order Bezier curve; and said modified curved line segment being determined, independently of information regarding any segment adjoining the segment being modified, by:

a) shifting P0 and P3 by said distance f in a direction normal to the original tangent lines at point P0 and P3, respectively, of the original outline, thereby obtaining a starting point P0' and an end point P3' of the modified curved line segment;

b) defining modified tangent lines for said modified curved line segment at points P0' and P3', the modified tangent lines being parallel to the original tangent lines of the original curved line segment at points P0 and P3, respectively; and c) defining control points P1" and P2" on said modified tangent lines of said modified curved line segment at points P0' and P3', respectively, such that a modified curved line segment is, over its entire length, a modification distance apart from said original curved line segment, the modification distance being substantially equal to f.

4. The method of claim 4, wherein said control points P1' and P2' are defined by:

$C_1$) defining interim control points P1' and P2' on the modified tangent lines of said modified curved line segment by projecting, in a direction perpendicular to said modified tangent lines, said control points P1 and P2 onto the modified tangent lines of said modified curved line segment; and $C_2$) shifting each interim control point along the tangent line of said modified curved line segment, over a distance f', the distance f' being a function of said fattening distance f and the angle between a straight line connecting the original control points P1 and P2, and the modified tangent line on which said interim control point is situated.

5. A method as in claim 3, wherein said predetermined fattening distance (f) is automatically selected as a function of a desired font size.

6. A method as defined in claim 3 wherein:

the raster output device has a fixed pixel size; and said predetermined fattening distance (f) is determined dependent on a preset font size and the fixed pixel size of the raster output device, such that the width of the horizontal and/or vertical stems of the characters as defined by the modified outline is equal to an integral number of pixels.

7. A method as in claim 4 wherein for a straight line segment, said modified outline is determined by shifting said straight line segment by said distance (f) in a direction normal to the line segment.

8. The method of claim 4, wherein, in step $C_2$), the shifting distance f' is given by the function $f'=(4/3)*f*(1-\cos(\phi))$, in which $\phi$ is equal to said angle.

9. The method of claim 4, wherein, in step (2), the shifting distance f' is given by the function $f'=(4/3)*f*(1-\cos(\phi/2))$, in which $\phi$ is equal to said angle.

10. A method as in claim 8 or 7, further comprising connecting adjacent end points of any new line segments by inserting additional line segments or by extending the line segments until they intersect, or if the modified line segments intersect already, by cutting the end portions at the intersection point.

11. A printer comprising:

a font memory for storing font data which defines shapes of original individual font characters as original outlines including curved line segments having the form of third order Bezier curves, each curved line segment being defined by control points P0, P1, P2 and P3, the points P0 and P3 being starting point and end point, respectively, and the points P1 and P2 being control points situated on original tangent lines at points P0 and P3, respectively, of said curved line segment;

a bitmap memory for storing bitmap representations of said individual characters;

a character generator for transforming said front data into said bitmap representations by filling an outline with discrete pixels;

a raster output device; and a controller for receiving encoded text data and for supplying bitmap data stored in said bitmap memory to said raster output device in accordance with said received text data;

said character generator also being for modifying said font data prior to transforming them into bitmap representations, the modified font data defining a font character with modified fatness;

said character generator including modifier means for determining, for each curved line segment of the original outline, independently of information regarding any segment adjoining the segment being modified, a modified curved line segment;

said modified curved line segment being a third order Bezier curve;

said modifier means including:

shifting means for shifting P0 and P3 by said distance f in a direction normal to the original tangent lines at points P0 or P3, respectively, of the original outline, thereby obtaining a starting point P0' and an end point P3' of the modified curved line segment;

tangent line means for defining modified tangent lines to said modified curved line segment at points P0' and P3', the modified tangent lies being parallel to the original tangent lines of the original curved line segment at points P0 and P3, respectively; and control point means defining control points P1" and P2" on said modified tangent lines of said modified curved line segment at points P0' and P3', respectively, such that a modified curved line segment is, over its entire length, a modification distance apart from said original curved line segment, the modification distance being substantially equal to f.

12. A printer as defined in claim 11, further including input means for inputting said fattening distance (f).

13. A printer as defined in claim 11, wherein said predetermined fattening distance (f) is automatically selected as a function of a desired font size.

14. A printer as defined in claim 11, wherein:

the raster output device has a fixed pixel size; and said predetermined fattening distance (f) is determined dependent on a preset font size and the fixed pixel size of the raster output device, such that the width of the horizontal and/or vertical stems of the characters as defined by the modified outline is equal to an integral number of pixels.

15. A printer as defined in claim 11, wherein:

said means for determining a modified curved line segment also includes:

calculating means for defining said control points P1" and P2" by $c_1$) defining interim control points P1' and P2' on the modified tangent lines of said modified curved line segment by projecting, in a direction perpendicular to said modified tangent lines, said control points P1 and P2 onto the modified tangent lines of said modified curved line segment; and $c_2$) shifting each interim control point along the tangent line of said modified curved line segment, over a distance f', the distance f' being a function of said fattening distance f and the angle between a straight line connecting the original control points P1 and P2, and the modified tangent line on which said interim control point is situated.

16. A printer as defined in claim 12, wherein said input means comprises a user operable switch.

* * * * *